United States Patent [19]

Simon

[11] Patent Number: 5,211,606
[45] Date of Patent: May 18, 1993

[54] TRANSMISSION COUPLING DEVICE WITH COMPOSITE RESILIENT ELEMENT

[75] Inventor: Jean-Michel Simon, Clamart, France

[73] Assignee: Hutchinson, France

[21] Appl. No.: 694,976

[22] Filed: May 6, 1991

[30] Foreign Application Priority Data

May 4, 1990 [FR] France .................. 90 05666

[51] Int. Cl.⁵ .............................. F16B 3/68
[52] U.S. Cl. ........................... 464/85; 464/81
[58] Field of Search .......... 464/51, 83, 85, 81, 464/88, 89; 192/106.1

[56] References Cited

U.S. PATENT DOCUMENTS

| | | | |
|---|---|---|---|
| 2,073,852 | 3/1937 | Radford | 464/85 X |
| 3,354,670 | 11/1967 | Fenwick | 464/89 X |
| 3,504,509 | 4/1970 | Paulsen | 464/85 |
| 3,747,367 | 7/1973 | Muller | 464/88 X |
| 4,241,593 | 12/1980 | Matyl et al. | 464/89 X |
| 4,391,594 | 7/1983 | Hannibal et al. | 464/80 |
| 4,664,642 | 5/1987 | Kirschey | 464/85 X |

FOREIGN PATENT DOCUMENTS

| | | |
|---|---|---|
| 0059267 | 9/1982 | European Pat. Off. . |
| 0133340 | 2/1985 | European Pat. Off. . |
| 1295753 | 11/1962 | France . |
| 2153489 | 8/1985 | United Kingdom . |

*Primary Examiner*—Daniel P. Stodola
*Assistant Examiner*—William G. Battista, Jr.
*Attorney, Agent, or Firm*—Larson and Taylor

[57] ABSTRACT

A device for damped resilient coupling between two coaxial rotary discs, the driving disc driving the driven disc in rotation in one direction or in the other so that transmission of the drive torque may take place progressively at least within a given angular range. Each of discs (1, 2) includes for this purpose at least one rest (4, 5) for the end of a resilient torque transmission element. The resilient element is formed essentially of a composite material (3) with relatively high modulus of elasticity, and is associated with a resilient damping mass (6).

11 Claims, 2 Drawing Sheets

TRANSMISSION COUPLING DEVICE WITH COMPOSITE RESILIENT ELEMENT

The invention relates to a damped resilient coupling device between two coaxial and parallel rotary discs, the driving disc driving the driven disc in rotation in one direction or in the other so that the transmission of the drive torque may take place progressively at least within a given angular range, each of said discs comprising for this at least one rest for the end of a resilient element transmitting the torque, formed essentially of a composite material with a relatively high modulus of elasticity, associated with a resilient damping mass.

The problem to which the invention relates is to cause one of the rotary discs to transmit its torque progressively to the other, i.e. resiliently, with appropriate damping to prevent the transmission of the vibrations of the driving disc to the driven disc.

This problem may arise in particular, although not exclusively, in friction clutches for motor vehicles. In conventional devices, the torsional strain between the input and the output shafts at the time of clutch engagement is transmitted by a set of helical springs disposed tangentially in a circle coaxial with the system. Their ends have a first system for bearing on the axially mobile disc which supports the clutch linings and a second system for bearing on a web of the hub of this disc, so that they are compressed whatever the direction of rotation of the disc, which makes possible resilient rotational coupling between the latter and the drive hub of the driven shaft.

A drawback of such a spring coupling device resides in the fact that the damping is weak and variable in time, since it is generally provided only by lateral friction of the metal springs on the walls of their housings in the disc.

Another drawback is that this device—which is highly non linear—does not allow an appreciable length of stroke and good progressiveness of the transmitted force to be obtained.

Another solution consists in replacing the metal springs and their stops by elastomer studs (of ethylene propylene-diene-monomer (EPDM) type generally). This solution has the following drawbacks:
- dynamic plastic flow of the elastomer which is stressed at high temperatures ($>120°$ C.),
- impossibility of adjusting the resilience and the damping independently.

The essential aim of the present invention is to avoid these drawbacks and in particular:
- to obtain better damping,
- to increase the angular stroke length (by about 50%) for transmitting the rated torque, so as to increase the progressiveness of the transmission of the torque, and
- to be able to adjust the resilience and the damping independently.

For this, a coupling device of the general type defined above will, in accordance with the present invention, be mainly characterized in that said composite material is in the form of at least one blade or a set of parallel blades embedded in said resilient damping mass and oriented so that, between the corresponding rests respectively fast with the driving disc and with the driven disc, the transmission of the torque between these discs takes place essentially by flexion of said blades, and damping by shearing of said resilient mass, the latter being adhered for this purpose to said blades and to said rests.

In other words, said resilient element has a sandwich structure, the number of blades with a high modulus of elasticity—providing the spring effect—embedded in the resilient damping mass not being critical. This flexion of the composite material blades generates a reaction which provides good progressiveness of the variation of the transmitted torque. The shearing of the resilient mass between the blades further allows excellent damping of the fluctuations of the torque to be obtained and so transmission of the vibrations to be limited.

It goes without saying that, as in the present technique, as many resilient elements will be provided between said discs as is necessary for transmission of the torque and, on each of these discs, the corresponding number of rests. There may for example be four such resilient elements between said rotary discs.

In any case, this essential characteristic of the invention overcomes the above mentioned drawbacks and in all cases provides the following advantages:
- a great progressiveness of the transmitted torque,
- considerable and reproducible damping,
- independent adjustment of the resilience and of the damping,
- excellent fatigue strength of the composite material,
- limited plastic flow,
- reduced size.

The blades may be placed under flexion in different ways. The simplest is to cause these blades to work as beams anchored at both ends and damped.

For this, a device in accordance with the present invention may be further characterized in that said rests are offset radially with respect to each other, said blades extending essentially in a radial direction.

The composite material blades may also be preformed as an arc of a circle or similar which further allows them to work under flexion.

Thus, a device according to the invention may be further characterized in that said rests are offset angularly with respect to each other, said blades extending essentially in an arcuate form between these rests.

In both cases, the relative angular movement and so the flexure of the blades may be limited, because of stops positioned appropriately on one or other of said rotary discs. These stops also provide safety should the composite break.

Furthermore, in order to make the flexional stresses uniform and avoid separation at the level of said rests, said resilient element, and particularly said resilient mass of these elements, are adapted so as to permit flexional deformation of said elements with the stresses made uniform, and these same rests are also given an arcuate or similar shape so that they adapt themselves to the deformation of said resilient elements.

In so far as the materials used are concerned, said composite material is essentially a glass fibre based material impregnated with a heat-hardenable resin of epoxy or vinyl ester type and said resilient mass is formed by EPDM or SBR (styrol butadiene) rubber.

Three exemplary embodiments of the invention will now be described by way of examples which are in no way limitative, with reference to the accompanying figures in which.

In the Figures, the coaxial rotary discs which are to be coupled resiliently and damped, one driving and the other driven, have been referenced 1 and 2. They may be considered as two flat, coaxial and parallel metal discs. Their relative direction of rotation is immaterial. The rests for the ends of the resilient coupling elements have been referenced 4 for the lower disc 1 and 5 for the upper disc 2, which has been partially cut away.

Figure 1:
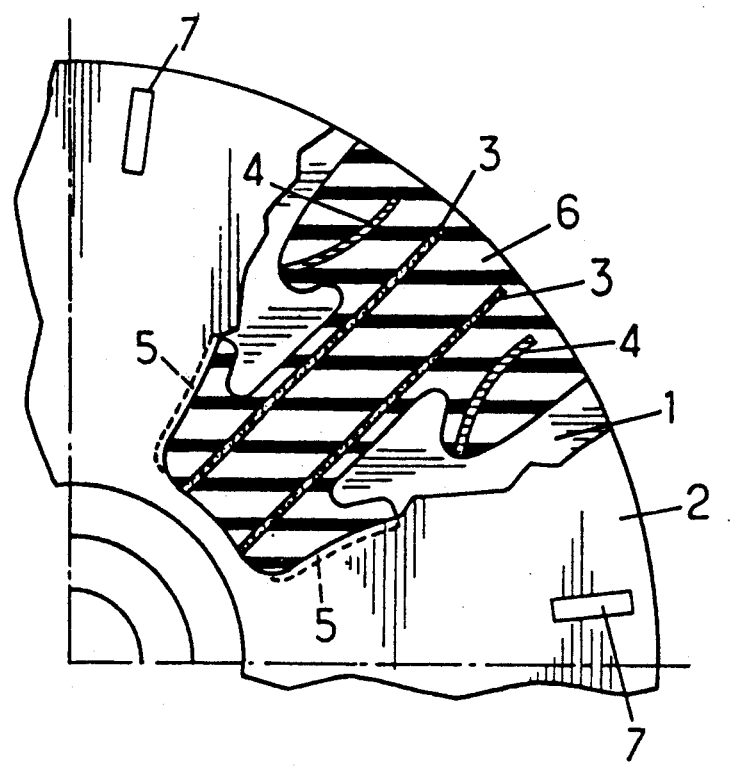
FIG. 1 is a partial view, with parts cut away, of a resilient element of a coupling device according to the invention, in the case where the two associated rests, fast respectively with each rotary disc, are offset radially.

In the embodiment shown in FIG. 1, it can be seen that the rests 4 and 5 have a particular (arcuate) shape which increases a distance from an adjacent composite element 3 as the rests 4,5 progress toward a radial center of the mass 6 such that this increasing distance is reduced by deformations under flexion of the resilient element. The same goes for the resilient mass 6 of this element, formed for example of natural rubber in which, while adhering thereto, these same rests 4 and 5 are embedded, as well as the radial blades of composite material 3 (glass fibres or similar embedded in a polymerized heat-hardenable resin).

Thus it can be seen that the resilient element 3-6 will work essentially under flexion during the progressive phase of transmitting the drive torque between the driving disc and the driven disc, with excellent damping due to the shearing of the rubber between the blades.

In this same FIG. 1, two stops have been shown at 7 for limiting the relative angular movement of the two discs, the maximum movement allowed being for example 30°.

Figure 2:
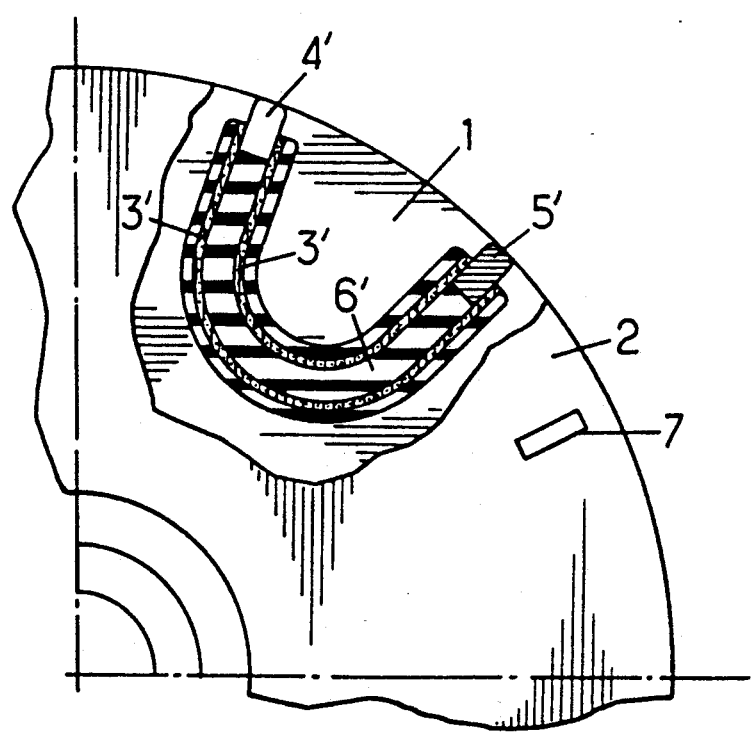
FIG. 2 is a similar view in the case of a purely angular shift of said rests.

In the embodiment shown in FIG. 2, the same materials as before may be used for forming the resilient elements 3',6'. Blades 3' again work under flexion, but in the manner of an arc, the end metal rests 4' (fast with the disc 1) and 5' (fast with disc 2) being offset angularly with respect to each other; damping is again obtained by shearing of the mass 6' and limiting the angular movement by stop 7.

In both embodiments, it is evident that the resilient elements 3, 6 will be sufficient in number (for example four) to provide the torque transmission and will be disposed with equal angular spacing on the discs for balancing the masses.

By way of example, the composite material blades 3 may a thickness of about 2 mm and a width of about 16 mm.

In a variant, finally, it should be noted that said resilient rotational connecting members could have any other form, for example the form of a solid coaxial disc (or disc sectors) adhered between the two rotary discs, this disc possibly incorporating composite material reinforcements in the form of rods. They could further be in the form of an elliptic tube section 3 or similar, made from a composite material. This tube could be mounted between the relative rests 4'', 5'' of the rotary discs similarly to that of the embodiment of FIG. 2, its opposite walls being connected inwardly by a resilient damping mass 6''.

Figure 3:
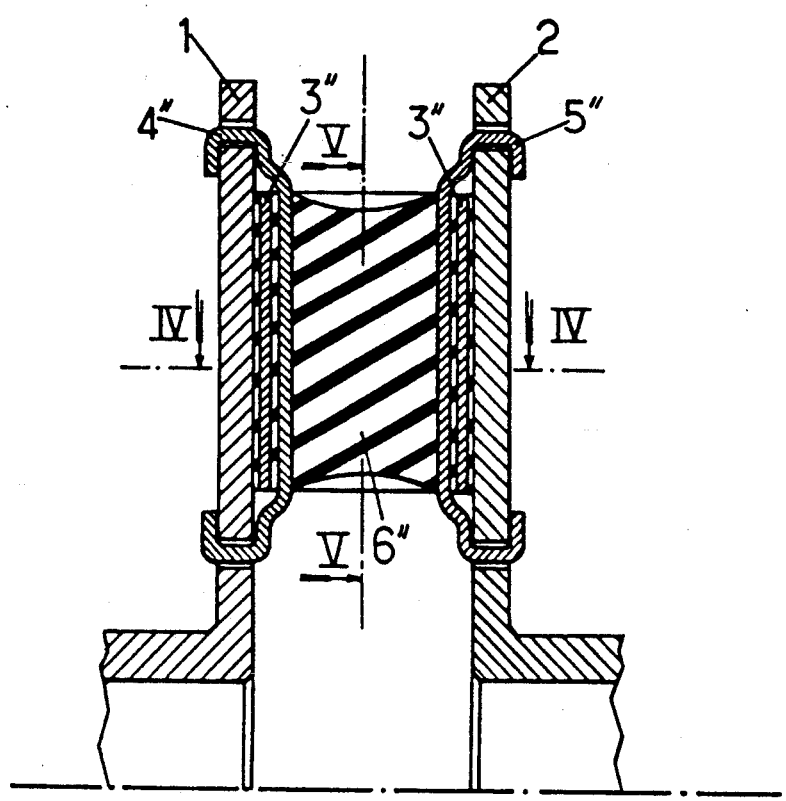
FIG. 3 shows in radial cross section a variant in which the resilient elements are in the form of a tube section with inner damping resilient mass.
Figure 4:
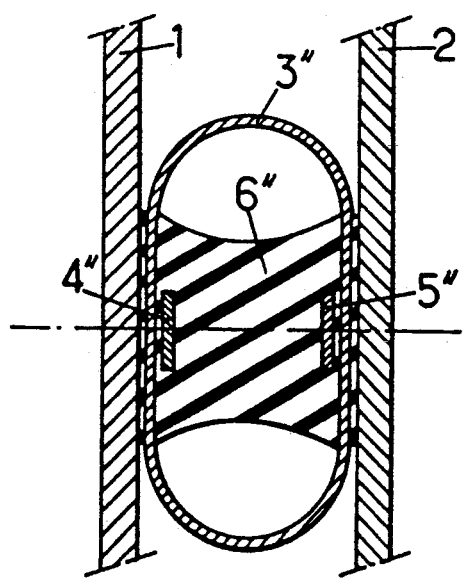
FIG. 4 is a sectional view through line IV—IV of FIG. 3.

Such an embodiment has been shown in FIGS. 3 and 4. It can be seen in FIG. 3 that these rests 4'', 5'' are in the form of a kind of clip passing inside tube 3 and crimped respectively on discs 1 and 2.

I claim:

1. A damped resilient coupling device for a progressive transmission of a drive torque between two coaxial and parallel rotary discs, the first rotary disc being a driving disc and the second rotary disc being a driven disc, said device comprising:

a resilient damping mass, disposed between the discs, for providing damping of vibrations between the discs by shearing of said damping mass when the drive torque is applied to the driving disk;

at least one blade formed of a composite material and having a relatively high modulus of elasticity with respect to said resilient damping mass, said blade being embedded in said resilient damping mass and providing a progressive transmission of the drive torque between the discs by a flexion of said blade; and a respective rest associated with a respective disc and embedded in said resilient damping mass for limiting the flexion of said blade.

2. The device according to claim 1, wherein said rests are offset radially with respect to each other, and wherein there are a plurality of said blades which are parallel and which extend essentially in a radial direction.

3. The device according to claim 1, wherein said rests are offset angularly with respect to each other, said angular offset being taken in the circumferential direction of said discs, and there are a plurality of said blades extending essentially in an arcuate form between these respective rests.

4. The device according to claim 1, further comprising a plurality of stops on one of said discs for limiting the relative angular movement of said discs.

5. The device according to claim 1, wherein said rests are arcuate shaped in said resilient mass when viewed in radial cross section.

6. The device according to claim 5, wherein said arcuate rests are disposed so as to increase a distance from an adjacent said blade as each said rest progresses toward a radial center of said damping mass.

7. The device according to claim 1, wherein said composite material is impregnated with a heat-hardenable resin selected from the group consisting of epoxies, vinyls and esters.

8. The device according to claim 1, wherein said resilient mass is rubber.

9. The device according to claim 1, wherein said resilient mass has a base selected from the group consisting of butyls, ethylene propylene-diene-monomers and SBRs.

10. The device according to claim 1 wherein there are a plurality of said blades arranged in groups of at least two blades, said blades of said groups being arranged to be parallel to one another, and wherein for each respective disc there is an associated said rest disposed on either radial side of said groups of blades.

11. A damped resilient coupling device for a progressive transmission of a drive torque between two coaxial and parallel rotary discs, the first rotary disc being a driving disc and the second rotary disc being a driven disc, said device comprising:

a resilient damping mass, disposed between the discs, for providing damping of vibrations between the discs by shearing of said damping mass when the drive torque is applied to the driving disc;

a resilient element for progressively transmitting the drive torque between the discs, said resilient element formed of a composite material tube section and having a relatively high modulus of elasticity with respect to said resilient damping mass, said tube section including respective portions adjacent a respective disc which are embedded in said damping mass with said damping mass extending between said portions; and a respective rest associated with a respective disc and adjacent said portion of said tube section for limiting a flexion of said tube section.

* * * * *